United States Patent
Palonen et al.

(10) Patent No.: US 9,593,283 B2
(45) Date of Patent: Mar. 14, 2017

(54) METHOD OF AND APPARATUS FOR CONTROLLING A GASIFIER

(71) Applicant: AMEC FOSTER WHEELER ENERGIA OY, Espoo (FI)

(72) Inventors: Juha Palonen, Varkaus (FI); Sami Kokki, Varkaus (FI); Katja Häkkinen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 8 days.

(21) Appl. No.: 14/648,321

(22) PCT Filed: Dec. 4, 2013

(86) PCT No.: PCT/FI2013/051138
§ 371 (c)(1),
(2) Date: May 29, 2015

(87) PCT Pub. No.: WO2014/096524
PCT Pub. Date: Jun. 26, 2014

(65) Prior Publication Data
US 2015/0315500 A1 Nov. 5, 2015

(30) Foreign Application Priority Data
Dec. 20, 2012 (FI) .................................... 20126352

(51) Int. Cl.
*C10J 3/72* (2006.01)
*C10J 3/46* (2006.01)
*C10J 3/50* (2006.01)
(Continued)

(52) U.S. Cl.
CPC ............... *C10J 3/503* (2013.01); *C10J 3/466* (2013.01); *C10J 3/56* (2013.01); *C10J 3/723* (2013.01);
(Continued)

(58) Field of Classification Search
CPC combination set(s) only.
See application file for complete search history.

(56) References Cited

U.S. PATENT DOCUMENTS 4,400,181 A 8/1983 Snell et al.
4,569,680 A * 2/1986 Darling .................... C10J 3/485
122/5

(Continued)

FOREIGN PATENT DOCUMENTS

| EP | 0 545 387 A1 | 6/1993 |
| EP | 2147965 A1 | 1/2010 |
| JP | S57-115489 A | 7/1982 |

OTHER PUBLICATIONS

Notification of and International Search Report and Written Opinion mailed on Feb. 18, 2014, in corresponding International Patent Application No. PCT/FI2013/051138.

(Continued)

*Primary Examiner* — Kaity Handal
(74) *Attorney, Agent, or Firm* — Fitzpatrick, Cella, Harper & Scinto

(57) ABSTRACT

A method of controlling a circulating fluidized bed gasifier includes feeding first and second portions of particulate material to be gasified through inlets in a gasifier. Oxygen and steam are fed through a bottom grid into a lower portion of the gasifier to fluidize the bed. Product gas and entrained particles are discharged from an upper portion of the gasifier. Particles are separated from the product gas and a portion of the separated particles is returned to the lower portion. A portion of the returned particles is oxidized to generate heat. Heat and oxidizing products from the lower portion are transferred to the center portion to generate the product gas. A ratio of the first and second portions of particulate material (Continued)

to be gasified is determined on the basis of a measured temperature profile so as to control the vertical temperature distribution in the gasifier.

10 Claims, 1 Drawing Sheet

(51) Int. Cl.
*G05B 15/02* (2006.01)
*C10J 3/56* (2006.01)

(52) U.S. Cl.
CPC .......... *G05B 15/02* (2013.01); *C10J 2200/15* (2013.01); *C10J 2300/0916* (2013.01); *C10J 2300/0946* (2013.01); *C10J 2300/0959* (2013.01); *C10J 2300/0976* (2013.01)

(56) References Cited

U.S. PATENT DOCUMENTS

| | | | |
|---|---|---|---|
| 4,799,937 A * | 1/1989 | Nieminen | C10J 3/54 422/142 |
| 4,968,325 A | 11/1990 | Black et al. | |
| 5,476,990 A * | 12/1995 | Hittner | A62D 3/32 423/111 |
| 6,117,199 A | 9/2000 | Ruottu | |
| 9,102,888 B2 * | 8/2015 | Freel | C10L 1/1802 |
| 2008/0222956 A1 * | 9/2008 | Tsangaris | C10J 3/005 48/77 |
| 2010/0058662 A1 * | 3/2010 | Xie | C10J 3/503 48/76 |
| 2010/0146856 A1 | 6/2010 | Zamansky et al. | |
| 2011/0146152 A1 * | 6/2011 | Vimalchand | C10J 3/56 48/61 |

OTHER PUBLICATIONS

Notification of and International Preliminary Report on Patentability mailed on Dec. 23, 2014, in corresponding International Patent Application No. PCT/FI2013/051138.

Finnish Office Action dated Oct. 1, 2015, issued in counterpart Finnish Patent Application No. 20126352.

* cited by examiner

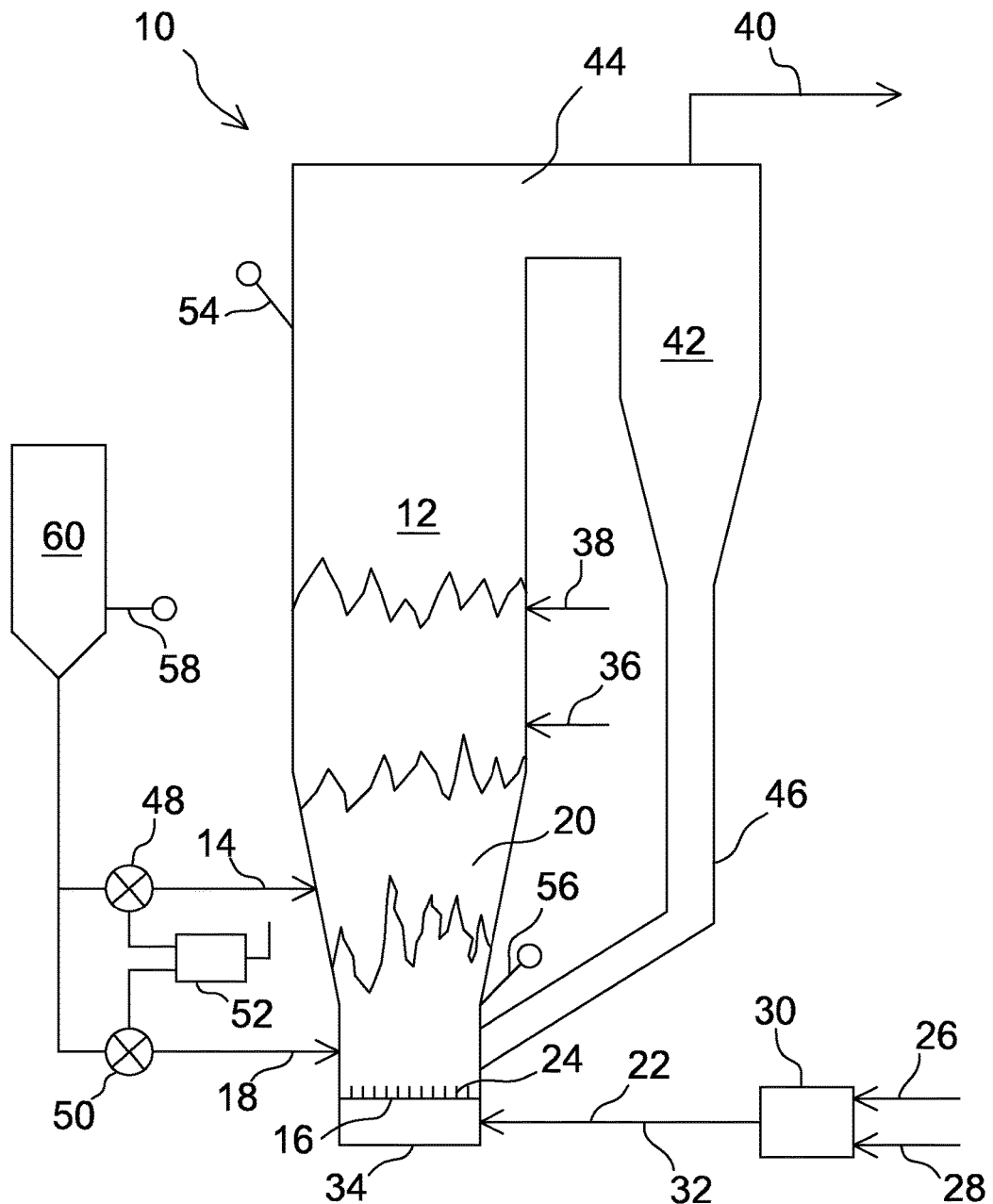

METHOD OF AND APPARATUS FOR CONTROLLING A GASIFIER

This application is a U.S. national stage application of PCT International Application No. PCT/FI2013/051138, filed Dec. 4, 2013, published as International Publication No. WO 2014/096524 A1, and which claims priority from Finnish patent application number 20126352, filed Dec. 20, 2012.

BACKGROUND OF THE INVENTION

Technical Field

The present invention relates to a method of controlling a gasifier. Particularly, the invention relates to controlling the temperature of a circulating fluidized bed gasifier gasifying uniform fuel, especially, plenty of volatile matter containing fuel, such as forest residue or other biomass, having a mixture of oxygen and steam as a gasification agent.

Background Art

A circulating fluidized bed gasifier having a mixture of oxygen and steam as a gasification agent can advantageously be used for gasifying, for example, biofuels. It is generally known that a high temperature in the lower portions of the bed increases risk of agglomeration of the bed. On the other hand, a low temperature in the upper portions of the gasifier may leave a relatively high amount of tars in the product gas, which decreases the gasifying efficiency and may cause fouling of the gas coolers and filtration units.

U.S. Pat. No. 6,117,199 discloses a typical circulating fluidized bed gasifier in which oxygen-containing gas is introduced as fluidizing gas through a bottom grid. Material to be gasified is fed to the gasifier 3 to 6 meters above the bottom grid to be converted into product gas and residual carbon in a reducing zone in the upper portions of the gasifier. Residual carbon is separated from the product gas and returned to the gasifier to be oxidized in an oxidizing zone in the lower portion of the gasifier. The circulation of bed material distributes the heat generated in the oxidizing reactions so that the temperature is 970 to 1200° C. in the oxidizing zone and 70 to 120° C. lower in the upper portions of the gasifier.

U.S. Pat. No. 4,400,181 discloses a pressurized circulating fluidized bed gasifier using a mixture of steam and oxygen as a gasifying agent for gasifying coal, which is fed into the gasifier at the center portion of the gasifying reactor. The temperature profile is controlled by feeding the gasifying agent into the gasifier at two levels, and by returning separated primary char to the center portion of the gasifier and finer secondary char to a lower portion of the gasifier.

U.S. Pat. No. 4,968,325 discloses a pressurized bubbling bed gasifier for gasifying biomass by steam-free oxygen-containing gas, for example, oxygen. The oxygen-containing gas is fed into a bottom section of the gasifier and the biomass is introduced into the area of maximum velocity, at a center portion of the bed, so as to obtain efficient distribution of the biomass into the bed.

U.S. Patent Application Publication No. 2010/0146856 A1 discloses feeding high-calorific-value feedstock, such as coal, with an oxidant into a first gasification zone and a low-calorific-value, high oxygen content feedstock, such as biomass, into a second gasification zone of a gasifier so as to control temperature distribution in the gasifier.

Japanese patent publication No. 57-115489 A discloses a fluidized bed gasifier in which a coarse portion of powdered coal is fed into the bottom of a fluidized gasifying bed and a fine portion of the powdered coal is fed to a top enlarged part of the gasifier. An advantage of the process is that generated tars are catalytically decomposed and gasified in the top portion of the gasifier.

It has also been suggested that the temperature profile of a circulating fluidized bed gasifier having a mixture of oxygen and steam as a gasification agent can be controlled by introducing fluidizing gas with a relatively low oxygen content, such as recirculated product gas, through a bottom grid of the gasification chamber, and introducing a controlled amount of a mixture of oxygen and steam as a secondary gas, and possibly, also as a tertiary gas, into higher portions of the gasification chamber. According to recent model-calculations having a mixture of oxygen and steam as a grid fluidizing gas, however, feeding of reasonable amounts of additional oxygen and steam as secondary and tertiary gas higher up in the gasification chamber does not considerably change the temperature profile, but the main effect of the additional gas feeding is that the average temperature in the gasifier increases. In any case, the use of recirculated product gas as a fluidizing gas requires equipment for recirculating the gas and brings about safety issues related to conveying and handling of combustible product gas. Furthermore, the use of high amounts of secondary and tertiary gas with high-oxygen content increases the risk of local hot spots and sintering in the upper portion of the gasifier.

Because of the need to minimize the tar concentration in the product gas, it is important that the temperature in the upper portion of the gasifier is sufficiently high, for example, 870 to 900° C. In case the temperature in the lower portion of the gasifier is clearly higher than that in the upper portion of the gasifier, maintaining a sufficient temperature in the upper portion may result in a too high temperature in the lower portion of the gasifier and cause operational problems, especially, agglomeration of the bed. A relatively large temperature difference between the upper and lower portions of a fluidized bed gasifier appears to prevail, especially in high operating pressures of the gasifier and with high oxygen contents of the fluidizing gas. Therefore, it is desirable to find new ways to simultaneously increase the temperature in the upper portions of the gasifier and lower the bed temperature so as to have an as uniform temperature profile as possible.

Another attempt to unify the temperature profile of a circulating fluidized bed gasifier includes arranging a heat exchanger for cooling circulating particles before they are introduced into the bed. However, according to model calculations, the cooling of the circulating particles surprisingly does not cool the bed locally so as to affect the temperature profile in the gasifier, but the profile remains approximately unchanged, and only the average temperature of the gasifier decreases.

An object of the present invention is to provide a simple and an efficient method of controlling the temperature distribution in a circulating fluidized bed gasifier.

SUMMARY OF THE INVENTION

According to one aspect, the present invention provides a method of controlling a circulating fluidized bed gasifier comprising the steps of (a) feeding a first portion of particulate material to be gasified through at least one inlet in a center portion of the gasifier so as to form a bed of material in the gasifier, (b) feeding oxygen and steam through a bottom grid into a lower portion of the gasifier so as to fluidize the bed, (c) discharging product gas and entrained particles from an upper portion of the gasifier, (d) separating particles from the product gas and returning a portion of the separated particles to the lower portion of the gasifier, (e) oxidizing a portion of the returned particles in the lower portion of the gasifier so as to generate heat, (f) transferring heat and oxidizing products from the lower portion of the gasifier to the center portion of the gasifier so as to generate the product gas, and (g) feeding a second portion of particulate material to be gasified through at least one inlet in the lower portion of the gasifier so as to control the vertical temperature distribution in the gasifier.

According to another aspect, the present invention provides an apparatus for controlling a circulating fluidized bed gasifier comprising (a) at least one inlet in a center portion of the gasifier for feeding a first portion of particulate material to be gasified so as to form a bed of material in the gasifier, (b) a bottom grid in a bottom portion of the gasifier for feeding a mixture of oxygen and steam into the bottom portion of the gasifier so as to fluidize the bed, (c) an outlet for discharging product gas and entrained particles from an upper portion of the gasifier, (d) a separator for separating particles from the product gas and a return channel for returning a portion of the separated particles to a lower portion of the gasifier, and (e) at least one inlet in the lower portion of the gasifier for feeding a second portion of particulate material to be gasified so as to control vertical temperature distribution in the gasifier.

When using the present invention, the fuel, or material to be gasified, is preferably biofuel. The fuel may alternatively be any fuel with a high volatile content, such as any type of biomass, peat, municipal, agricultural and industrial wastes, sewage sludge, or refuse derived fuel (RDF). In many cases, the fuel is wet, i.e., it has a relatively high moisture content. In some cases, the fuel may also be high-volatile fossil fuel, such as lignite. According to the present invention, the fuel is uniform, i.e., the same kind of fuel is fed through the inlets in the center portion of the gasifier and the inlets in the lower portion of the gasifier.

The fuel feeding inlets can be equipped by any type of fuel feeders that are suitable for the purpose. Mainly, depending on the type of the fuel and the pressure in the gasifier, the fuel feeders may comprise, for example, suitable conveying screws, pneumatic conveyors, or piston feeders.

In a conventional circulating fluidized bed gasifier, as described, for example, in U.S. Pat. No. 6,117,199, U.S. Pat. No. 4,400,181 and U.S. Pat. No. 4,968,325, oxygenous gas is fed into a lower portion of the gasifier and material to be gasified is fed into a center portion of the gasifier. Because of returning separated char to oxidizing conditions in the lower portion of the gasifier, the temperature of the lower portion of the gasifier tends to become too high and/or the temperature of the higher portion of the gasifier tends to become too low.

According to the present invention, the vertical temperature distribution, or the temperature profile, of the gasifier is controlled by feeding a portion of the material to be gasified into the gasifier chamber through fuel feeding points located in the lower portion of the gasifier. Bed particles are distributed throughout the gasifier chamber of a circulating fluidized bed gasifier, but the density of the bed particles is highest in the lower portion of the gasifier, and, correspondingly, the lower portion of a circulating fluidized the gasifier is also called the bed area of the gasifier. Therefore, it can also be said that, in a gasifier according to the present invention, there are additional or further fuel feeding inlets in the bed area of the gasifier.

A basic idea behind the present invention is that fresh fuel that is fed into the lower portion of the gasifier does not rapidly oxidize and, thereby, does not release further heat in the lower portion of the gasifier. To the contrary, by introducing fresh fuel into the bed area, the bed temperature is lowered by energy consumed in drying and devolatilization processes of the fuel. The fresh fuel also consumes available oxygen in partial oxidation to CO, and thereby slows down oxidation of char in the lower portion of the gasifier.

According to the present invention, the fuel feeding scheme, i.e., the division of fuel to be fed through the fuel feeding inlets in the bed area and in the center portion of the gasifier, is used as a tool to control the temperature profile of the gasifier. It is, however, possible to perform further temperature profile control, for example, by adjusting the feed rates of the mixture of oxygen and steam through secondary and tertiary gas feeding openings.

The inlet in the center portion of the gasifier for feeding the first portion of the fuel, a so-called first inlet, is typically located at a height that is 10-50%, preferably 15-30%, of the total height of the gasifier. Advantageously, the first inlet is 3 to 6 meters above the bottom grid. The first inlet could also be called a conventional fuel inlet, because it corresponds to the fuel feed locations shown, for example, in U.S. Pat. No. 6,117,199, U.S. Pat. No. 4,400,181, and U.S. Pat. No. 4,968,325. The first inlet may be a single inlet or it may comprise several inlets distributed on the perimeter of the gasifier and/or at different heights in the center portion of the gasifier. The number of fuel feeding inlets mainly depends on the geometry and size of the gasifier, the type of the fuel feeding devices, and the type of the fuel, i.e., on how efficiently the fuel can be distributed from a single inlet.

The inlet in the lower portion of the gasifier for feeding the second portion of the fuel, a so-called second inlet, is typically located at a height that is less than 10% of the total height of the gasifier. Preferably, the second inlet is less than 3 meters, more preferably, from 0.5 meters to 2.5 meters, above the bottom grid. The second inlet differs from a conventional fuel inlet, as described above, in being at a clearly lower level. The second inlet may be a single inlet or it may comprise several inlets distributed on the perimeter of the gasifier and/or at different heights in the lower portion of the gasifier. Due to the location of the second inlets, the bed pressure is higher at the second inlets than at the first inlets. Therefore, the fuel feeders connected to the second inlets may be of a different type than those connected to the first inlets, even if the fuel introduced through the first and second inlets is the same.

The ratio of the fuel streams fed through the first and second inlets may vary depending, e.g., on the type and particle size of the fuel. Preferably, at most 50%, more preferably, 10-50%, of the fuel is fed through the first inlets, and preferably, at least 50%, more preferably, 50-90%, of the fuel is fed through the second inlets. Typically, the ratio of the fuel streams fed through the first and second inlets is varied on the basis of the variations in the fuel quality, such as the particle size or the humidity, so as to obtain a desired temperature profile in the gasifier.

According to a preferred embodiment of the present invention, the temperature profile of the gasifier is measured by measuring the temperature in at least two height levels of the gasifier, and the ratio of the fuel streams fed through the first and second inlets is varied based on the measured temperature profile. According to another preferred embodiment of the present invention, the fuel quality, for example, the particle size or humidity of the fuel, is measured, and the ratio of the fuel streams fed through the first and second inlets is varied based on the measured fuel quality.

The streams of oxygen and steam, which, according to the present invention, act both as a gasification agent and as fluidizing gas, can be introduced into the gasifier as separate streams, but preferably, they are introduced as a mixture that is formed in gas feeding channels, in a wind box below the bottom grid, or, at the latest, in gas feeding nozzles of the bottom grid. Generally, most of the mixture of oxygen and steam is fed through the bottom grid, but a portion of the mixture can also be fed as secondary gas or tertiary gas at higher levels of the gasifier. It is possible that the oxygen content of the mixture is different in different gas feeding points, but preferably, the same mixture is fed through the bottom grid and through gas feeding nozzles or openings of the secondary and tertiary gas.

Preferably, the oxygen content of the mixture of oxygen and steam is from 23% to 65% (in weight). The pressure in the gasifier is preferably from 1 bar to 30 bars. The operation of the gasifier according to the present invention does not require recirculation of gases or cooling of recirculating solids. Thus, the gas yield and the process efficiency are high.

The above brief description, as well as further objects, features, and advantages of the present invention, will be more fully appreciated by reference to the following detailed description of the currently preferred, but nonetheless illustrative, embodiments of the present invention, taken in conjunction with the accompanying drawing.

BRIEF DESCRIPTION OF THE DRAWING

FIG. 1 is a schematic diagram of a gasifier according to an embodiment of the present invention.

DETAILED DESCRIPTION OF THE DRAWING

FIG. 1 shows a schematic diagram of a circulating fluidized bed gasifier 10 according to the present invention. Material to be gasified, or fuel, is introduced into a gasifier chamber 12 through a first fuel feeding inlet 14 located in the center portion of the gasifier chamber, here, about 5 meters above the bottom grid 16, and a second fuel feeding inlet 18 located in the lower portion of the gasifier 10, here, about 1.5 meters above the bottom grid. In practice, there may be several fuel feeding inlets in the center portion and in the lower portion of the gasifier, but, for simplicity, only one fuel feeding inlet in the center portion of the gasifier and in the lower portion of the gasifier are shown in FIG. 1.

A bed of particulate material 20 formed in the gasifier chamber is fluidized with a mixture 22 of oxygen and steam injected to the gasifier chamber through nozzles 24 or openings in the bottom grid 16. Zigzag-lines in FIG. 1 indicate symbolically that the density of the bed is highest at the bottom portion of the gasifier and decreases continuously towards the top of the gasifier 10. The mixture of oxygen and steam is formed by mixing streams of oxygen 26 and steam 28 in a mixing chamber 30 arranged in a gas feeding channel 32 upstream of a wind box 34 arranged below the bottom grid 16 of the gasifier chamber 12. If desired, further streams of the mixture of oxygen and steam can be injected into the gasifier chamber through secondary and tertiary gas feeding nozzles 36, 38 arranged in the upper portion of the gasifier chamber 12.

Fuel fed into the gasifier chamber 12 through the first and second fuel feeding inlets 14, 18 is dried, vaporized, gasified, and partially oxidized in different processes in the gasifier, and product gas formed in the processes is discharged from the gasifier 10 via a gas discharge channel 40 to further processing and use. A cyclone separator 42 arranged in connection with the upper portion of the gasifier chamber 12 separates particles, including char particles, from the product gas that is discharged from the gasifier chamber 12 through an outlet opening 44 in the top portion of the gasifier chamber 12. Particles, including char particles, separated from the product gas in the cyclone separator 42 are returned through a return channel 46 to the lower portion of the gasifier chamber 12.

Returned char particles are oxidized in the lower portion of the gasifier chamber 12. The oxidation process releases heat that is partially used in the drying, vaporizing, and gasifying of the fuel. In order to avoid overheating and possible agglomeration of the bed in the lower portion of the gasifier 10, a portion of fuel is introduced into the gasifier 10, as stated above, through the lower, or second, fuel feeding inlet 18.

More generally, the temperature profile in the gasifier chamber 12 is controlled by varying the ratio of the fuel streams fed into the gasifier 10 through the first and second fuel feeding inlets 14, 18. By feeding a larger portion of the fuel through the lower fuel feeding inlet 18, the temperature in the bed area, or in the lower portion, of the gasifier 10 is decreased. Thereby, it is possible to lower the temperature in the bed area at the same time as the temperature in the upper portion of the gasifier 10 is maintained high enough that an amount of tars in the product gas is minimized. Ideally, a uniform temperature can be maintained throughout the gasifier chamber 12.

According to a preferred embodiment of the present invention, the ratio of the fuel streams fed into the gasifier 10 through the first and second fuel feeding inlets 14, 18 is determined by controlling flow regulators 48, 50 of the fuel streams, which may be of any suitable type, by a controller 52, on the basis of information obtained from thermocouples or other type of thermometers 54, 56 in the upper and lower portions of the gasifier chamber 12. Alternatively, the ratio of the fuel streams fed into the gasifier 10 through the first and second fuel feeding inlets 14, 18 is determined by controlling the flow regulators 48, 50 by the controller 52 on the basis of one or more characteristics of the fuel quality, such as moisture content or particle size, obtained by measuring the fuel quality, for examples, by a probe 58 in a common fuel bin 60, or by regularly analyzing samples of the fuel. Because the temperature profile measurement relates to the prevailing state in the gasifier, but the fuel quality measurement relates to the future, it is especially useful, especially for some fuels, to control the ratio of the fuel streams through the first and second fuel feeding inlets 14, 18 on the basis of both a temperature profile measurement and a fuel quality measurement or fuel analysis.

The temperature profile can be further tuned by other methods, for example, by varying the gas flows through secondary and tertiary gas nozzles 36, 38. The pressure in the gasifier 10 is typically from 1 bar to 30 bars, but preferably, it is at least 4 bars. The oxygen content of the fluidizing gas, as well as that of the secondary and tertiary gas, is advantageously from 23% to 65% in weight.

Three-dimensional simulation calculations were used to analyze the effect of the present invention on the temperature profile of a circulation fluidized bed gasifier. According to a first calculated example, corresponding to a conventional gasifier having a total height of 18 meters, in which all fuel was fed into the gasifier through an inlet in the center portion of the gasifier, more particularly, 3.5 meters above the bottom grid, temperature in the bed area was 940° C. when it was 870° C. in the upper portion of the gasifier. Thus, there was a risk of sintering of the bed and/or generating a high amount of tars in the product gas.

In a second example, 50% of the fuel was fed through an inlet located 3.5 meters above the grid, while the rest of the fuel was fed into the lower portion of the gasifier, less than 1 meter above the grid. By this change, the temperature difference between the bed area and upper portion of the gasifier was decreased to about 45° C. In a third example, 80% of the fuel was fed into the lower portion of the bed and only 20% was fed into the conventional location about 3.5 meters above the grid. By this change, the temperatures throughout the gasifier chamber remained within 15° C. In a fourth example, when all fuel was fed into the lower part of the bed, the temperatures were again relatively uniform throughout the gasifier, but the bed temperature was even lower than that in the upper portion of the gasifier.

The calculations performed show that by (a) selecting the fuel feeding locations in a proper way and (b) changing the fuel feed ratio between the feeding points in the vertical direction, it is possible to affect the gasifier temperature profile in a very effective way. By using this control method, together with a possible use of secondary and/or tertiary feed gases, oxygen content of the fluidizing gas can be kept high and the use of recirculation gas can be avoided. The number of feeding points at each level as well as the feeding capacity of each feeding point is dimensioned so that the required feeding ranges and feeding ratio can be achieved.

The present invention makes it possible to widen the particle size distribution and fuel quality or moisture content of the material to be gasified. In other words, by adjusting the feed flow rates in the different fuel feeding levels, the sensitivity of the gasification process to the variations in the characteristics of the fuel is minimized.

Important issues in developing gasification using a mixture of oxygen and steam as the gasification agent have been to maximize the temperature of the upper portion of the gasifier, to maximize the oxygen content of the fluidizing gas, and to maximize the operating pressure. This invention, i.e., dividing the fuel feeding to different vertical levels and controlling the feed flow rate to each level, offers an efficient way to control the gasifier temperature profile, and to freely optimize both the fluidizing gas oxygen efficiency and operating pressure.

While the invention has been described herein by way of examples in connection with what are, at present, considered to be the most preferred embodiments, it is to be understood that the invention is not limited to the disclosed embodiments, but is intended to cover various combinations or modifications of its features and several other applications included within the scope of the invention, as defined in the appended claims.

The invention claimed is:

1. A method of controlling a circulating fluidized bed gasifier, the method comprising the steps of:
    (a) feeding a first portion of particulate material to be gasified through at least one inlet in a center portion of the gasifier, wherein the at least one inlet in the center portion of the gasifier is at a height that is ten to fifty percent of the total height of the gasifier, so as to form a bed of material in the gasifier;
    (b) feeding oxygen and steam upwards through a bottom grid into a lower portion of the gasifier so as to fluidize the bed, wherein the lower portion of the gasifier is positioned above the bottom grid;
    (c) discharging product gas and entrained particles from an upper portion of the gasifier;
    (d) separating particles from the product gas and returning a portion of the separated particles to the lower portion of the gasifier;
    (e) oxidizing a portion of the returned particles in the lower portion of the gasifier so as to generate heat;
    (f) transferring heat and oxidizing products from the lower portion of the gasifier to the center portion of the gasifier so as to generate the product gas;
    (g) feeding a second portion of particulate material to be gasified through at least one inlet in the lower portion of the gasifier, wherein the at least one inlet in the lower portion of the gasifier is at a height that is less than 10% of the total height of the gasifier;
    (h) measuring a temperature profile in the gasifier and determining a ratio of the first and second portions of particulate material to be gasified on the basis of the measured temperature profile; and
    (i) controlling the vertical temperature distribution in the gasifier, based on the measured temperature profile, by controlling the ratio of (1) the first portion of particulate material fed in the center portion of the gasifier, in the height of 10% to 50% of the total height of the gasifier, and (2) the second portion of particulate material fed in the lower portion of the gasifier, in the height of less than 10% of the gasifier, respectively.

2. The method according to claim 1, wherein the at least one inlet in the center portion of the gasifier is at a height that is fifteen to thirty percent of the total height of the gasifier.

3. The method according to claim 1, wherein the at least one inlet in the center portion of the gasifier is three to six meters above the bottom grid.

4. The method according to claim 1, wherein the at least one inlet in the lower portion of the gasifier is less than three meters above the bottom grid.

5. The method according to claim 4, wherein the at least one inlet in the lower portion of the gasifier is from 0.5 meters to 2.5 meters above the bottom grid.

6. The method according to claim 1, further comprising feeding oxygen and steam as a mixture through gas feeding channels leading to a wind box below the bottom grid, the mixture being fed from the wind box through the bottom grid into the lower portion of the gasifier.

7. The method according to claim 1, further comprising feeding oxygen and steam as a mixture through gas feeding channels leading to gas feeding nozzles of the bottom grid, the mixture being fed from the bottom grid through the nozzles into the lower portion of the gasifier.

8. The method according to claim 1, wherein the material to be gasified is selected from the group consisting of biomass, peat, municipal waste, agricultural waste, industrial waste, sewage sludge, refuse derived fuel, and lignite.

9. The method according to claim 1, further comprising feeding from 10% to 50% of the material to be gasified through the at least one inlet in the center portion of the gasifier.

10. The method according to claim 9, further comprising feeding from 50% to 90% of the material to be gasified through the at least one inlet in the lower portion of the gasifier.

* * * * *